No. 785,564. PATENTED MAR. 21, 1905.
O. M. MOWAT.
CHUCK.
APPLICATION FILED OCT. 14, 1903.
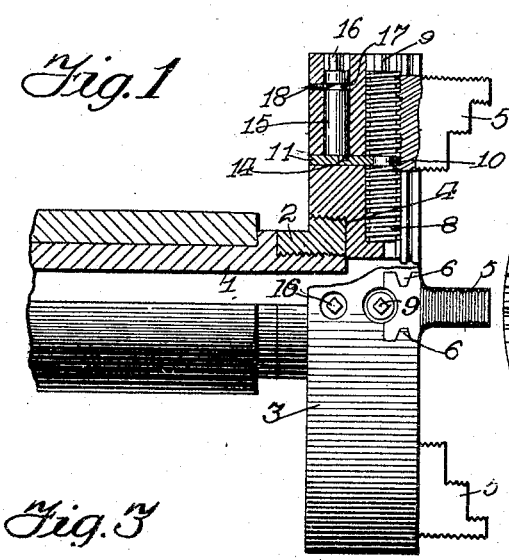
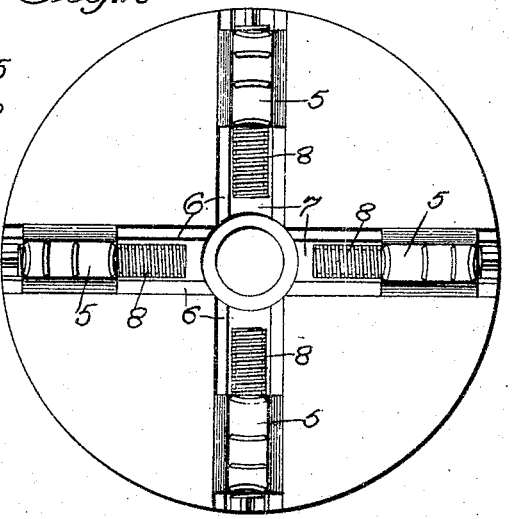
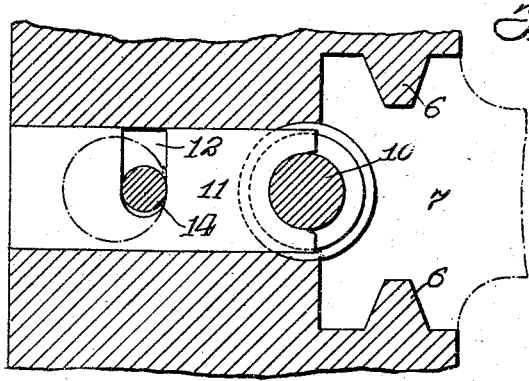
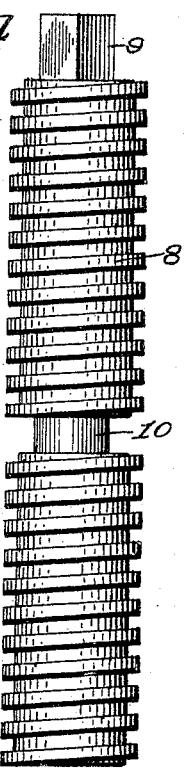
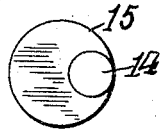
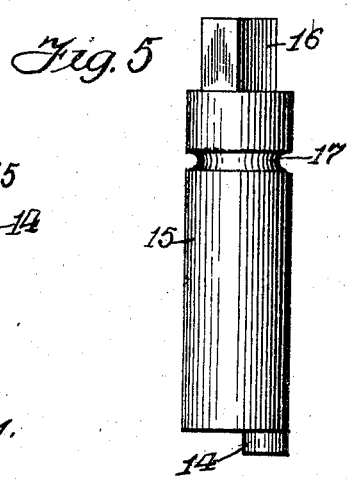
Witnesses:
Geo. B Rowley,
E. E. Patten.
Inventor:
O. M. Mowat,
By H. C. Evert &c.
Attorneys.

No. 785,564. Patented March 21, 1905.

UNITED STATES PATENT OFFICE.

OLIVER M. MOWAT, OF McKEESPORT, PENNSYLVANIA.

CHUCK.

SPECIFICATION forming part of Letters Patent No. 785,564, dated March 21, 1905.

Application filed October 14, 1903. Serial No. 177,023.

*To all whom it may concern:*

Be it known that I, OLIVER M. MOWAT, a citizen of the United States of America, residing at McKeesport, in the county of Allegheny and State of Pennsylvania, have invented certain new and useful Improvements in Chucks, of which the following is a specification, reference being had therein to the accompanying drawings.

This invention relates to certain new and useful improvements in chucks such as are used in connection with lathes and like machines; and the object of the present invention is to provide means whereby the chuck-jaws may be rapidly adjusted or removed at any time that it is desired to make a material adjustment or effect the removal of the said jaws.

Heretofore and before my invention it has been the common practice in connection with lathe-chucks, whether of the independent or universal type, to adjust the jaws by means of screws engaging said jaws and moving the same either toward the center of the chuck or away from such center, according to the direction of rotation imparted to the screws. Where the jaws are set for holding a piece of small diameter and it is desired to adjust the jaws to accommodate a piece of considerably greater diameter or dimensions, no provision is made for the rapid adjustment of the jaws, dependence being had entirely on the spreading of the jaws by the turning of the screws. With my invention, however, it is possible where it is desired to adjust the jaws to any material extent or remove the jaws for reversing to effect this adjustment or removal and reversal rapidly by mechanism which permits of the jaws being pulled out of their ways without necessitating action by the screws and the replacing of the jaws in engagement with the screws at another position thereon or the reversing of the jaws, as may be desired.

Another object of the present invention is to dispense with the ordinary method of bolting the body of the chuck to the face-plate carried by the spindle, and a still further object is to provide means for giving a greater bearing and a broader surface to the base of the jaws.

Briefly described, the invention comprises a chuck-body provided with radial ways of special construction, which are adapted to receive the jaws that are to be moved in and out in said ways. These jaws are preferably of the stepped type ordinarily employed in connection with chucks of this character, their inner ends, however, being of special construction and traveling in the ways provided therefor in the chuck-body. The jaws are moved in and out in their ways by means of actuating-screws held in place by the locking mechanism normally engaging the screw approximately midway of its length and which when released permits the withdrawal of the screw and jaw without necessitating the turning of the screw to effect the withdrawal.

All of the above construction will be hereinafter more fully described, and specifically pointed out in the claims, and in describing the invention in detail reference is had to the accompanying drawings, forming a part of this specification, and wherein like numerals of reference indicate like parts throughout the several views, in which—

Figure 1 is a partial plan and sectional view of my improved chuck. Fig. 2 is a front elevation thereof. Fig. 3 is a horizontal sectional view of a part of the chuck-body. Fig. 4 is a detached enlarged side elevation of one of the screws. Fig. 5 is a like view of the actuating-shaft for the locking-plate. Fig. 6 is an end view of the same.

In the accompanying illustration I have shown the chuck provided with gripping-jaws, though it will of course be evident that I am not confined to these particular jaws in operating the chuck in accordance with my invention.

1 indicates the spindle of the lathe or other machine and on which is threaded the face-plate 2 in the usual manner. It is the common practice to construct this plate in such a manner as to provide an annular flange to permit of the bolting of the chuck-body thereto; but in my improved construction I provide the periphery of the face-plate 2 with threads and form a recess 4 in the rear face of the chuck-body of greater diameter than and registering with the axial opening therein and thread the surrounding wall of this groove to engage with the threads on the periphery of the face-plate, thus affording a convenient and more effective means for securing the chuck-body to the face-plate. The gripping-faces of the jaws 5 are of the ordinary stepped corrugated form, these jaws, however, at their inner ends being provided at opposite sides with grooves of substantially V-shaped form extending throughout the length of the sides of the jaw, and which grooves are adapted to receive the tongues 6, formed on the opposite side walls of the radial ways 7, formed in the face of the chuck-body 3. This construction of the tongue 6 on the opposite side walls of the ways 7 enables me to obtain a considerably greater bearing-surface and broader base for the jaws without increasing the body of the jaw, thus enabling the jaws to better withstand the strain brought to bear against the same when they are holding a piece of large dimensions. Back of the radial ways 7 the chuck-body is provided with radial recesses or openings in which the actuating-screws 8 operate, each of said screws having the usual wrench-head 9 and are provided approximately at their center with a groove or unthreaded portion 10. The threads of the screws 10 are adapted to engage with the threads provided therefor on the rear faces of the jaws 5. For each of the screws 8 there is provided a locking-plate 11, which extends into the chuck-body from the rear face thereof, and is received in the groove 10 of the screw. This plate is provided in its one side edge with a notch 12, which receives the eccentrically-mounted stud 14, formed on the inner end of the locking-pin 15, the said pin being mounted in a recess provided therefor in the chuck-body and having a wrench-receiving head 16, whereby the same wrench as is employed for actuating the screws 8 may be used for turning the locking-pin 15. This pin 15 may be held in the chuck-body in any suitable manner, as by providing the same with a peripheral groove 17 to receive one end of the pin or screw 18 inserted thereinto through the rear face of the chuck-body.

When it is desired to adjust the jaws but a slight distance, the screws 8 are actuated, whereby to move the jaws according to the direction in which the screws are turned to effect the desired adjustment. In case, however, it is desired to make a greater adjustment of the jaws or to remove the jaws to reverse the same the wrench (not shown) is applied to the head 16 and pin 15 is rotated, whereby to cause the eccentrically-mounted stud 14 to move locking-plate laterally of the chuck-body out of engagement with the groove 10 in the screw, so that the operator may take hold of the jaw and withdraw the latter, together with its screw 8, outwardly, either entirely removing the same from the chuck-body or moving it out to any desired distance. The jaw may be then moved from the position it occupies on the screw to any other desired position on the screw which will give the approximate adjustment or the jaw removed from engagement with the screw and reversed and replaced in engagement with the screw, the jaw and screw being then reinserted in the chuck-body and the locking-plate permitted to reëngage in the groove 10 of the screw to hold the latter in position. The screw may then be actuated to effect any exact adjustment desired. By this construction I am enabled to effect a rapid adjustment of the jaws where the same are adjusted to any great extent. Especially am I enabled to obtain a quick adjustment of the jaws when it is desired to remove the latter and reverse the same in order to hold certain shapes of work.

By the particular construction of the jaw—that is, by widening the base of the jaws, as shown—they are better able to withstand the strain thereon when holding a piece of large dimensions, and this without increasing the size of the jaw-body.

It will be noticed in the practice of the invention that various changes may be made in the details of construction without departing from the general spirit of the invention.

Having fully described my invention, what I claim as new, and desire to secure by Letters Patent, is—

1. The combination of a chuck-body having a plurality of radially-disposed slots, jaws slidably mounted in said slots, a plurality of screws equal in number to the jaws and disposed in the rear of and in alinement with the slots in which the jaws are mounted and engaging the jaws, said screws being each formed with a peripheral groove, sliding locking-plates engaging the peripheral grooves in the screws, revoluble pins arranged in the chuck-body, eccentrically-disposed studs carried by said pins, said studs working in slots in the said sliding plates.

2. The combination of the chuck-body having a plurality of radially-disposed slots, jaws slidably mounted in said slots, a plurality of screws equal in number to the jaws and disposed at the rear of and in alinement with the slots in which the jaws are mounted and engaging said jaws, said screws being each formed with a peripheral groove, sliding plates arranged in the chuck-body and formed with lateral notches, the ends of said plates engaging the peripheral grooves in the screws, revoluble locking-pins mounted in recesses in the chuck-body and formed with peripheral grooves, screws engaging the peripheral grooves in said locking-pins, eccentrically-disposed studs carried by said locking-pins and working in the notches in said plates.

3. A chuck-body formed with radial ways, jaws working in said ways, screws mounted in the rear of said jaws and engaging teeth on the jaws, said screws being formed with peripheral grooves, locking-plates engaging said grooves, means for actuating said locking-plates to engage and disengage them from said grooves.

4. In a chuck, the combination of a chuck-body, having a plurality of radial ways, jaws mounted in said ways, means removably mounted in the chuck-body for independently moving each jaw, locking-plates for holding the jaw-moving means in the body and means for causing said locking-plates to be engaged with and disengaged from the jaw-moving means.

In testimony whereof I affix my signature in the presence of two witnesses.

OLIVER M. MOWAT.

Witnesses:
A. M. WILSON,
E. E. POTTER.